United States Patent
Nakane et al.

(10) Patent No.: US 7,100,158 B2
(45) Date of Patent: Aug. 29, 2006

(54) PROGRAM MANAGEMENT APPARATUS, PROGRAM MANAGEMENT SYSTEM, AND PROGRAM MANAGEMENT METHOD

(75) Inventors: Rintaro Nakane, Yokohama (JP); Osamu Tachiyama, Tachikawa (JP); Kazuo Sumioka, Yokohama (JP); Seiya Shimizu, Numazu (JP); Shuichi Tsujimoto, Yokohama (JP); Masanori Kawasumi, Koshigaya (JP); Yoshito Nakanishi, Inba (JP); Yaeko Harada, Tokyo (JP); Masayuki Fukusawa, Ichikawa (JP); Hirofumi Harada, Funabashi (JP)

(73) Assignee: Toshiba TEC Kabushiki Kaisha, Tokyo (JP)

( * ) Notice: Subject to any disclaimer, the term of this patent is extended or adjusted under 35 U.S.C. 154(b) by 531 days.

(21) Appl. No.: 10/134,538

(22) Filed: Apr. 30, 2002

(65) Prior Publication Data

US 2003/0204841 A1  Oct. 30, 2003

(51) Int. Cl.
 *G06F 9/44* (2006.01)
(52) U.S. Cl. .................. 717/172; 717/168; 717/171; 717/173
(58) Field of Classification Search ........ 717/100–178; 711/154; 705/9–26
See application file for complete search history.

(56) References Cited

U.S. PATENT DOCUMENTS

| | | | | |
|---|---|---|---|---|
| 6,041,183 A | * | 3/2000 | Hayafune et al. ........... | 717/173 |
| 6,594,737 B1 | * | 7/2003 | Niwa et al. ................ | 711/154 |
| 6,714,916 B1 | * | 3/2004 | Robertson et al. .......... | 705/9 |
| 2002/0184113 A1 | * | 12/2002 | Ono et al. .................. | 705/26 |
| 2002/0184610 A1 | * | 12/2002 | Chong et al. ............... | 717/109 |
| 2003/0066066 A1 | * | 4/2003 | Nguyen et al. ............. | 717/178 |
| 2003/0093768 A1 | * | 5/2003 | Suzuki ....................... | 717/100 |
| 2003/0229883 A1 | * | 12/2003 | Savov et al. ................ | 717/100 |

FOREIGN PATENT DOCUMENTS

| | | |
|---|---|---|
| JP | 06-131163 | 5/1994 |
| JP | 11-282724 | 10/1999 |

\* cited by examiner

*Primary Examiner*—Kakali Chaki
*Assistant Examiner*—Mark P. Francis
(74) *Attorney, Agent, or Firm*—Foley & Lardner LLP

(57) ABSTRACT

There is provided a program management apparatus adapted to perform a program updating operation of a program by downloading the program from a server which manages an information of the program to a predetermined terminal device, including: a pattern setting unit, which retains plural kinds of patterns each serving as a mode for giving an information inclusive of a program and updating such a program, for allowing a user to select one of the patterns so as to previously set it as a selected pattern; and a program updating unit for, upon activation of a program updating operation, automatically performing the program updating operation according to the selected pattern set by the pattern setting unit.

2 Claims, 10 Drawing Sheets

| MODEL NO. | SERIAL NO. | OLD VERSION | UPDATED VERSION | THE CONTENT OF VERSION-UP |
|---|---|---|---|---|
| MDL10 | 9823109 | VER1.0 | VER1.5 | HOLEPUNCH FUNCTION-CAPABLE VERSION |
| MDL33 | 9840522 | VER1.3 | | |
| MDL50 | 1315215 | VER2.0 | VER2.5 | |
| MDL87 | 1322141 | VER1.7 | | |

FIG. 10

| MODEL NO. | SERIAL NO. | CURRENT VERSION | UPDATED VERSION? | CHECK BOX |
|---|---|---|---|---|
| MDL10 | 9823109 | VER1.0 | VER1.5 | |
| MDL33 | 9840522 | VER1.3 | | |
| MDL50 | 1315215 | VER2.0 | VER2.5 | |
| MDL87 | 1322141 | VER1.7 | | |

FIG. 11

| MODEL NO. | SERIAL NO. | CURRENT VERSION | UPDATED VERSION? | CHECK BOX |
|---|---|---|---|---|
| MDL10 | 9823109 | VER1.0 | VER1.5 | x |
| MDL33 | 9840522 | VER1.3 | | |
| MDL50 | 1315215 | VER2.0 | VER2.5 | x |
| MDL87 | 1322141 | VER1.7 | | |

FIG. 12

PROGRAM MANAGEMENT APPARATUS, PROGRAM MANAGEMENT SYSTEM, AND PROGRAM MANAGEMENT METHOD

BACKGROUND OF THE INVENTION

1. Field of the Invention

The present invention relates to a program management apparatus, a program management system and a program management method and, particularly, relates to a program management apparatus, a program management system and a program management method adapted to execute an update of a current program by a new program which is downloaded via a communication network from a version management server.

2. Description of the Related Art

A kind of program management system as mentioned above is designed to execute a remote maintenance of a terminal device by a host computer, e.g., as disclosed in Japanese Patent Laid-Open Publication No. HEI-6-131163. The host computer according to the invention of this publication is configured to download a program to the terminal device by a predetermined method. In this program management system for executing the remote maintenance, a single method is consistently and permanently used for such a maintenance.

In many kinds of enterprises, there is variety in number of men of talent enabled to be allocated to a program management and/or in ability level of such men depending to the enterprises' scales and economical affairs. However, regardless of various affairs of such enterprises, communications machines such as multi-function peripherals (MFPs) commonly used by these enterprises have to possess performances or functions capable of dealing with the majority of affairs of the enterprises as users.

SUMMARY OF THE INVENTION

In order to solve the above-mentioned problems, an object of the present invention is to provide a program management apparatus, a program management system and a program management method for preparing plural patterns, each serving as a mode for updating a program, so as to be capable of dealing with situations on a user's side and allow a user to select one of them and automatically performing a program updating operation of a program when the updating operation of the program becomes necessary.

With this configuration, in order to perform the program updating operation of a user's multi-function peripheral device, the user is permitted to previously set an optimum pattern suitable for the user's situations as a selected pattern by the pattern setting means. Then, upon activation of the program updating operation, the program updating means will automatically perform the program updating operation according to the optimum pattern set by the pattern setting means, thereby satisfying user's requirements.

Among the plural kinds of patterns as mentioned above, there is a pattern having a selection function to notify the user of the completion of a download job. On the contrary, there is a pattern having a selection function not to notify the user of the completion of a download job. Also, among the plural kinds of patterns, there is a pattern comprising the step of giving the user a query whether or not the program updating operation should be performed when an information of the program is sent from said server. Further, there is a pattern comprising the step of requesting the transmission of an information of the program from said server.

BRIEF DESCRIPTION OF THE DRAWINGS

FIG. 10 illustrates a diagram of a job completion notification transmitted from a version management server to a user after the completion of the version-up operation;

FIG. 11 illustrates a diagram of a version-up query table transmitted from the version management server to the user so as to query whether or not a version-up should be made;

FIG. 12 illustrates answers to the version-up query diagram as shown in FIG. 11.

DESCRIPTION OF PREFERRED EMBODIMENTS

Hereinafter, preferred embodiments of the present invention will be described in detail with reference to the accompanying drawings.

Figure 1:
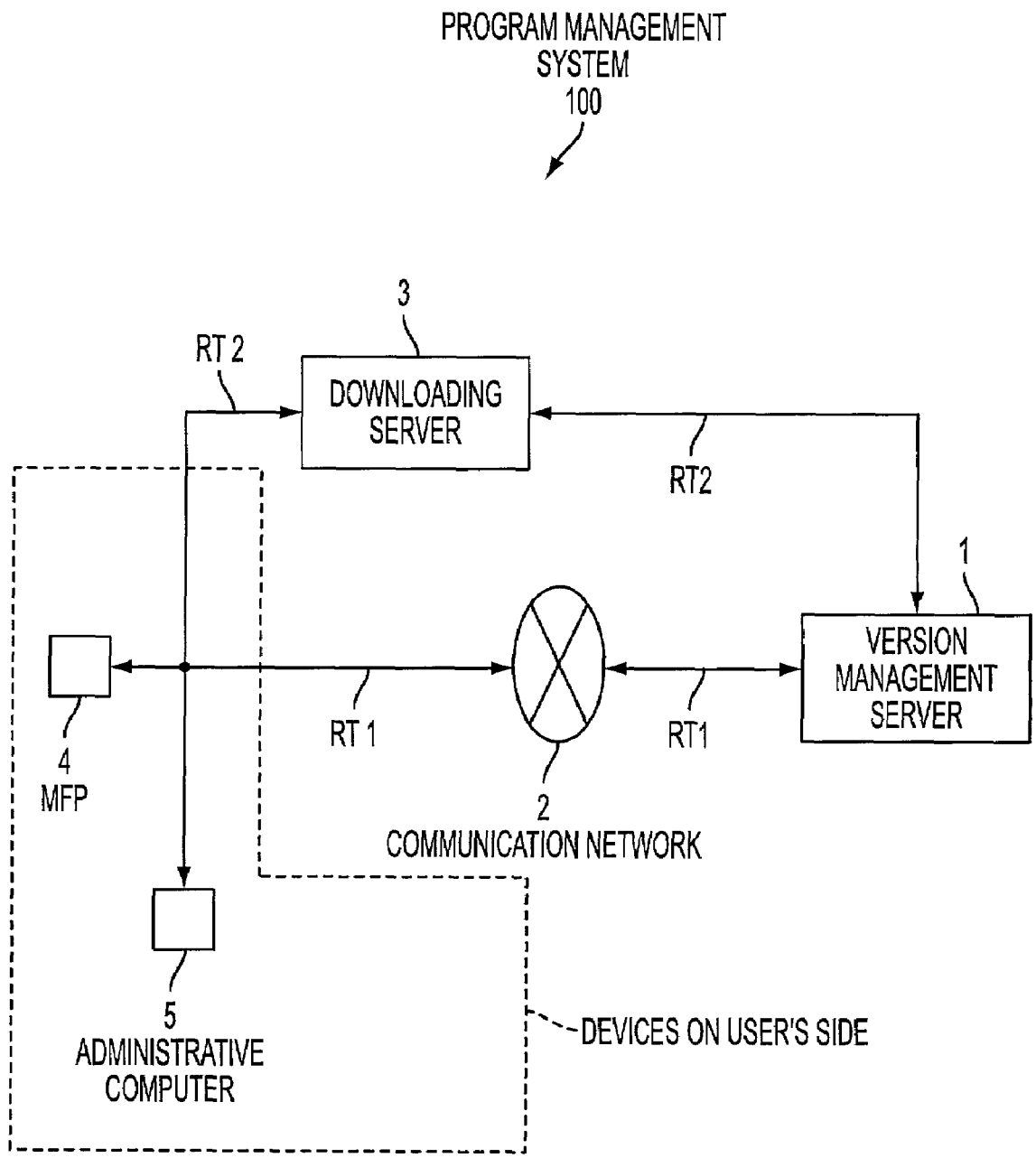
FIG. 1 is a schematic block diagram illustrating an embodiment of a program management system according to the present invention.
Figure 2:
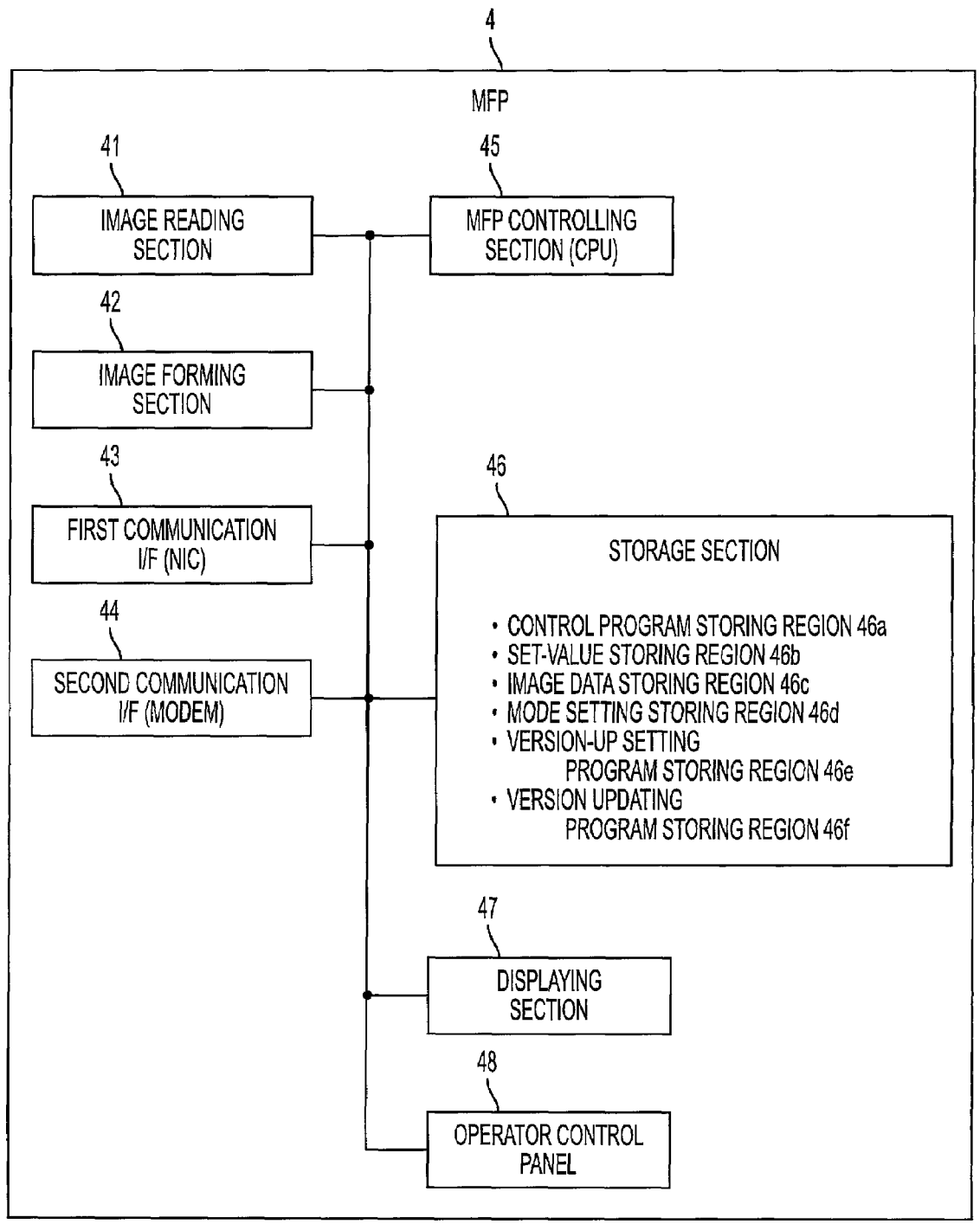
FIG. 2 is a schematic block diagram illustrating various components of an MFP as shown in FIG. 1.
Figure 3:
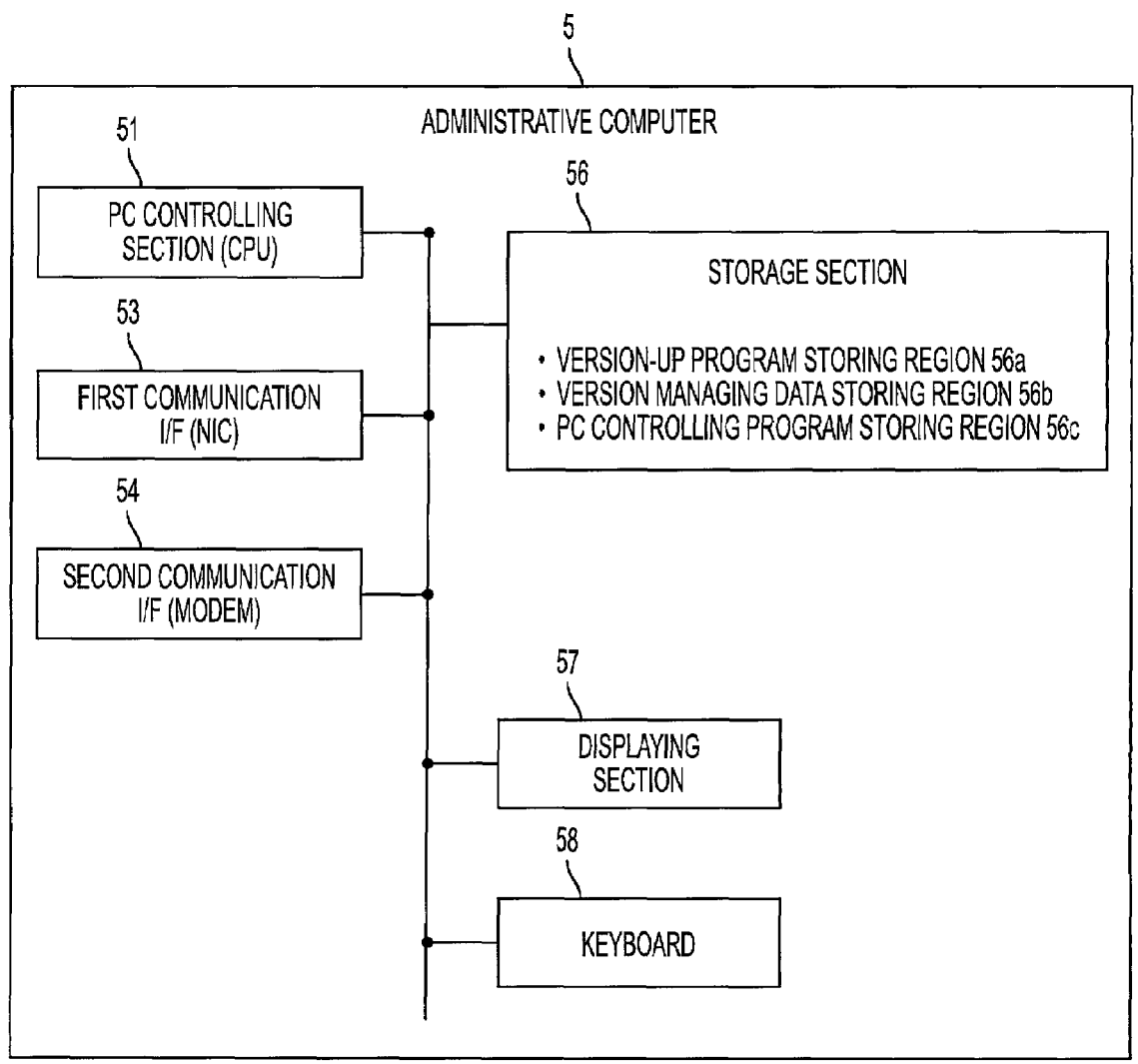
FIG. 3 is a schematic block diagram illustrating various components of a management computer as shown in FIG. 1.
Figure 13:
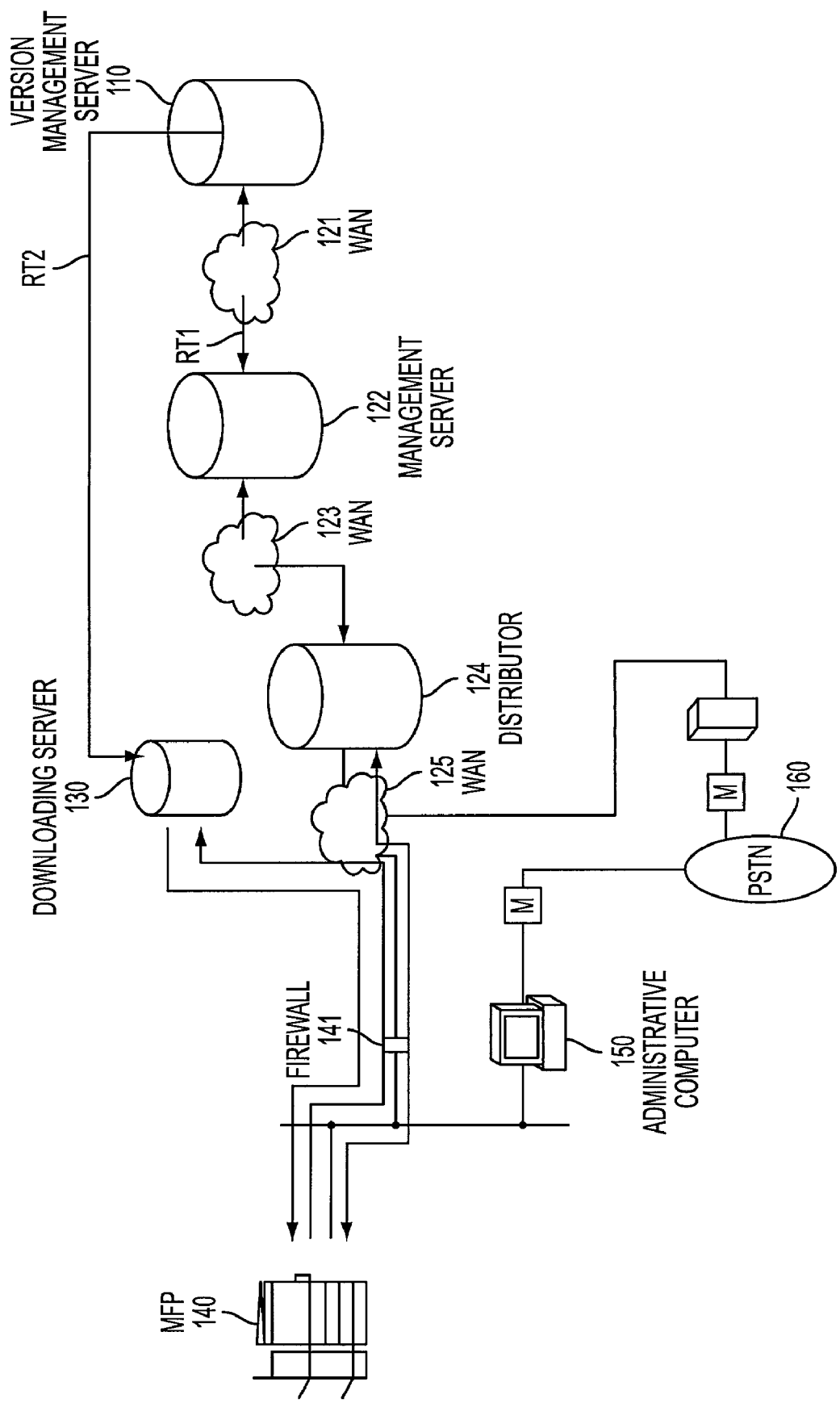
FIG. 13 is a block diagram illustrating one example of more specifically implementing the program management system as shown in FIG. 1.

FIG. 1 is a schematic diagram showing an embodiment of a program management system according to the present invention; FIG. 2 is a block diagram illustrating various components of an MFP as shown in FIG. 1; FIG. 3 is a block diagram illustrating various components of a management computer as shown in FIG. 1; FIGS. 4 to 9 are flow charts illustrating operations for performing a program update in the program management system as shown in FIG. 1; FIGS. 10 to 12 are diagrams illustrating the contents of the picture displayed in a displaying section during the program updating operation; and FIG. 13 is a block diagram illustrating one example of more specifically implementing the program management system as shown in FIG. 1.

In a program management system 100 of FIG. 1, a version management server 1 is connected to an MFP (Multifunction Peripheral) 4 and an administrative computer (administrative PC) 5 by a first route RT 1 (such as the Internet) via a communication network 2 and a second route RT 2 (having a larger transmission capacity) via a downloading server 3. Various control programs as used by the MFP 4 of this program management system 100 (any program other than the control program may be used but the control program is used in this embodiment) are automatically made version-up depending on switchable setting contents. In this embodiment, such a switching operation of the setting contents is performed by selecting one of patterns A, B, C and D as described later on.

As shown in FIG. 2, the MFP 4 comprises: an image reading section 41; an image forming section 42, a first communication interface (NIC) 43 connected to a public switched telephone network (PSTN); a second communication interface (Modem) 44 connected to a LAN or the Internet; a MFP controlling section 45 including a CPU as a main component; a storage section 46; a displaying section 47; and an operator control panel 48.

The storage section 46 in this embodiment comprises: a control program storing region 46a; a set-value storing region 46b; an image data storing region 46c; a mode setting storing region 46d; a version-up setting program storing region 46e; and a version updating program storing region 46f. In this MFP4, the image reading section 41 and the image forming section 42 cooperates to perform a copier function, the image forming section 42 and the first communication interface 43 cooperates to perform a printer function; the image reading section 41 and the second communication interface 44 cooperates to perform a facsimile transmitting device function; and the image forming section 42 and the second communication interface 44 cooperates to perform a facsimile receiving device function.

As shown in FIG. 3, the administrative computer 5 comprises: a PC controlling section 51 including a CPU as a main component; a first communication interface (NIC) 53; a second communication interface (Modem) 54; a storage section 56; a displaying section 57; and a key board 58.

The storage section 56 in this embodiment comprises: a version-up program storing region 56a; a version managing data storing region 56b; a PC controlling program storing region 56c. In this case, the version-up program storing region 56a stores therein a version-up program to be executed in the administrative computer 5 when the version-up operation of a control program is made.

Hereinafter, it will be described how a pattern as a mode for executing a version-up operation of a control program for the MFP in the program management system is set and how that pattern is executed with reference to FIGS. 4 and 5.

Figure 4:
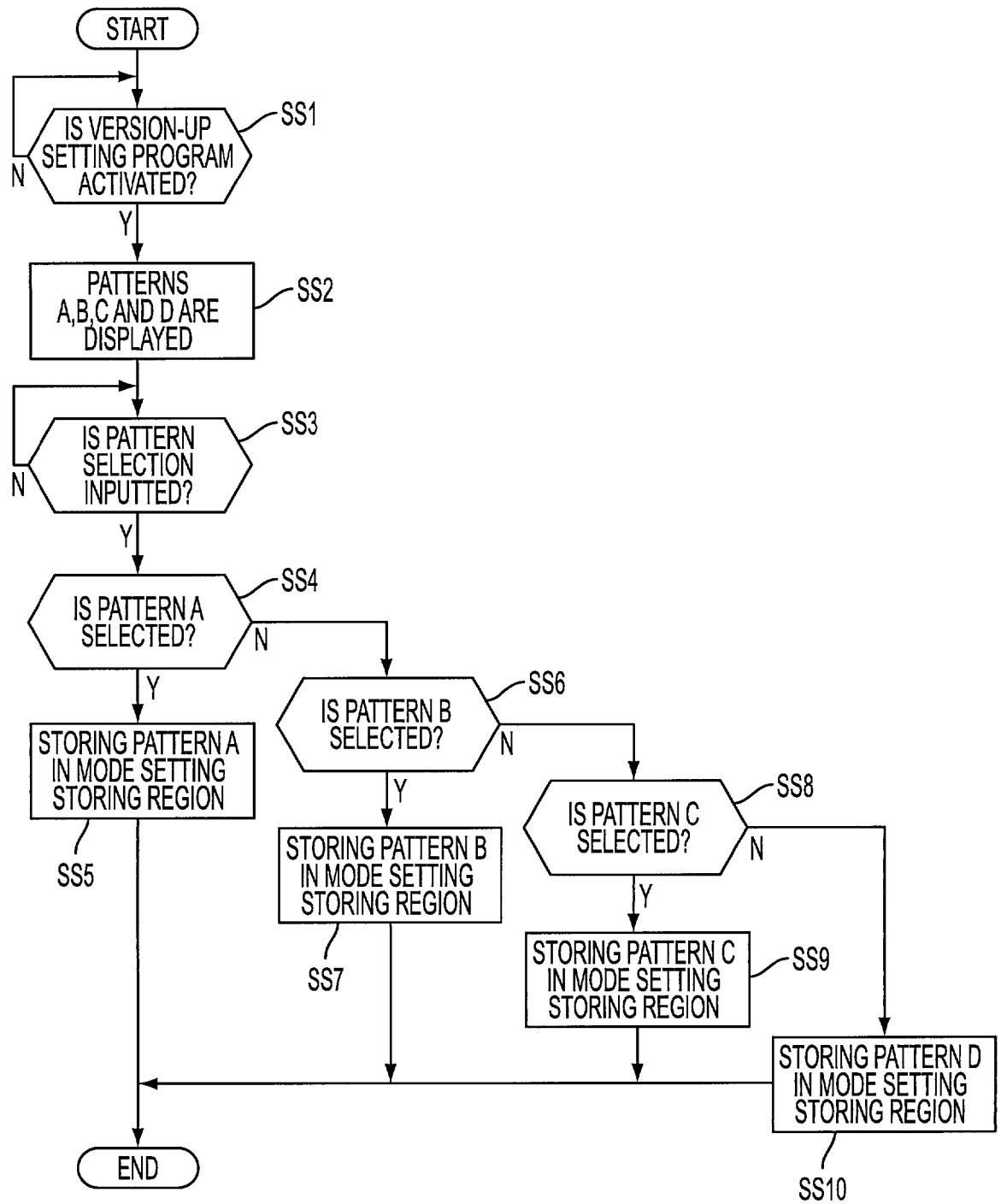
FIG. 4 is a flow chart illustrating a process of setting a mode for determining which pattern should be used to perform a version-up operation of a control program for the MFP in the program management system as shown in FIG. 1.
Figure 5:
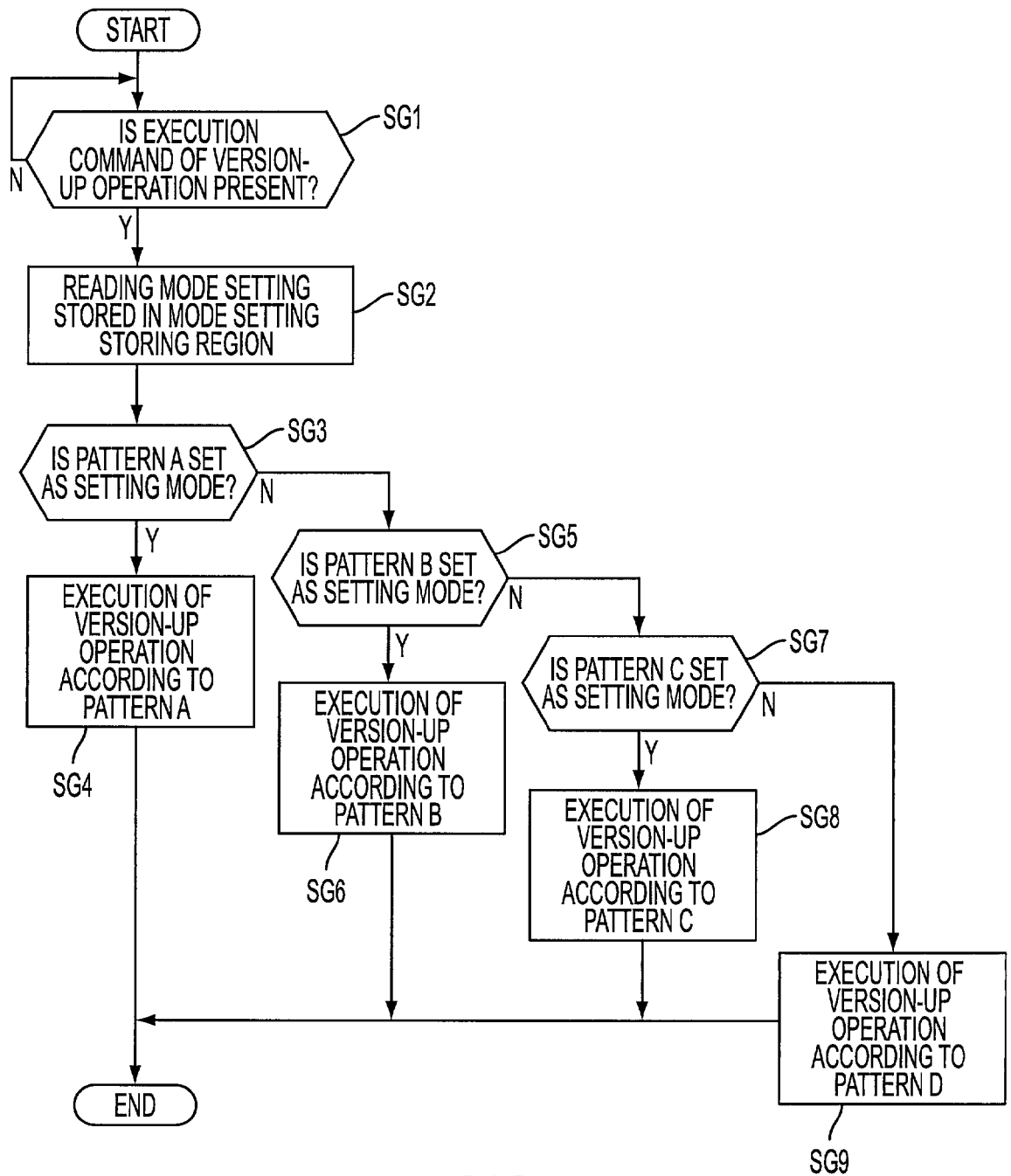
FIG. 5 is a flow chart illustrating an operation of reading a pattern set as shown in FIG. 4 and deciding it as a mode setting before the version-up operation of the control program.

FIG. 4 is a flow chart illustrating an operation of an mode setting for determining which pattern should be used to execute or perform the version-up operation of the control program for the MFP in the program management system as shown in FIG. 1. Although it may be possible to set or determine such a pattern by one of the version management server 1, the MFP 4 or the administrative computer 5, the MFP 4, among others, is employed for that purpose in this embodiment. In response to any instruction, the MFP controlling section 45 activates the version-up setting program stored in the version-up setting program region 46e of the storage section 46. In step SS 1, it is decided whether or not its activation is completed. If the activation has been completed, then the version-up patterns A, B, C and D are displayed on the operator control panel 48 so that it is prompted which pattern on the panel should be selected in step SS 2.

Then, in step SS 3, it is decided if there was an input for selecting one of the version-up patterns A, B, C and D as displayed on the operator control panel 48. If there was such a selective input, then it is decided in step SS 4 whether or not that input was to select the pattern A. If so, then the pattern A (for example, 00H) will be stored in the mode setting storing region 46d of the storage section 46 in step SS 5. However, if it has been decided in step SS 4 that the input was not to select the pattern A, then it is decided in step SS 6 if there was an input for selecting the pattern B. If the input was to select the pattern B, then the pattern B (for example, 01H) will be stored in the mode setting storing region 46d of the storage section 46 in step SS 7. However, if it has been decided in step SS 6 that the input was not to select the pattern B, then it is decided in step SS 8 if there was an input for selecting the pattern C. If the input was to select the pattern C, then the pattern C (for example, 10H) will be stored in the mode setting storing region 46d of the storage section 46 in step SS 9. However, if it has been decided in step SS 8 that the input was not to select the pattern C, then it is decided that there was an input for selecting the pattern D. The pattern D (for example, 11H) will be stored in the mode setting storing region 46d of the storage section 46 instep SS 10. Thus, either one of the pattern A, B, C or D is stored in the mode setting storing region 46d of the storage section 46 and then this flow is ended.

Next, an operation of reading one of the patterns A, B, C or D and deciding it as a mode setting after the pattern setting for the version-up is completed as shown in FIG. 4 will be described with reference to FIG. 5. The MFP controlling section 45 of the MFP 4 decides in step SG 1 whether or not an execution command of the version-up operation is present. If it has been decided that that execution command was present, then the mode setting stored in the mode setting storing region 46d is read in step SG 2 and then it is decided in step SG 3 whether or not the mode setting is the pattern A. As a result of the decision in step SG 3, if the pattern A has been decided to be the mode setting, then the version-up operation will be executed according to the pattern A, as described later on, in step SG 4. However, if the pattern A has not be decided to be the mode setting, then it is decided in step SG 5 whether or not the mode setting is the pattern B. As a result of the decision in step SG 5, if the pattern B has been decided to be the mode setting, then the version-up operation will be executed according to the pattern B, as described later on, in step SG 6. However, if the pattern B has not be decided to be the mode setting, then it is decided in step SG 7 whether or not the mode setting is the pattern C. As a result of the decision in step SG 7, if the pattern C has been decided to be the mode setting, then the version-up operation will be executed according to the pattern C, as described later on, in step SG 8. Also, as a result of the decision, if the pattern C has not been decided to be the mode setting, then the pattern D is so decided and the version-up operation will be executed according to the pattern D, as described later on, in step SG 9.

Next, the version-up operation of the control program to be executed according to any one of the patterns A, B, C or D will be described in detail with reference to FIGS. 6, 7, 8 or 9.

Figures 6, 7:
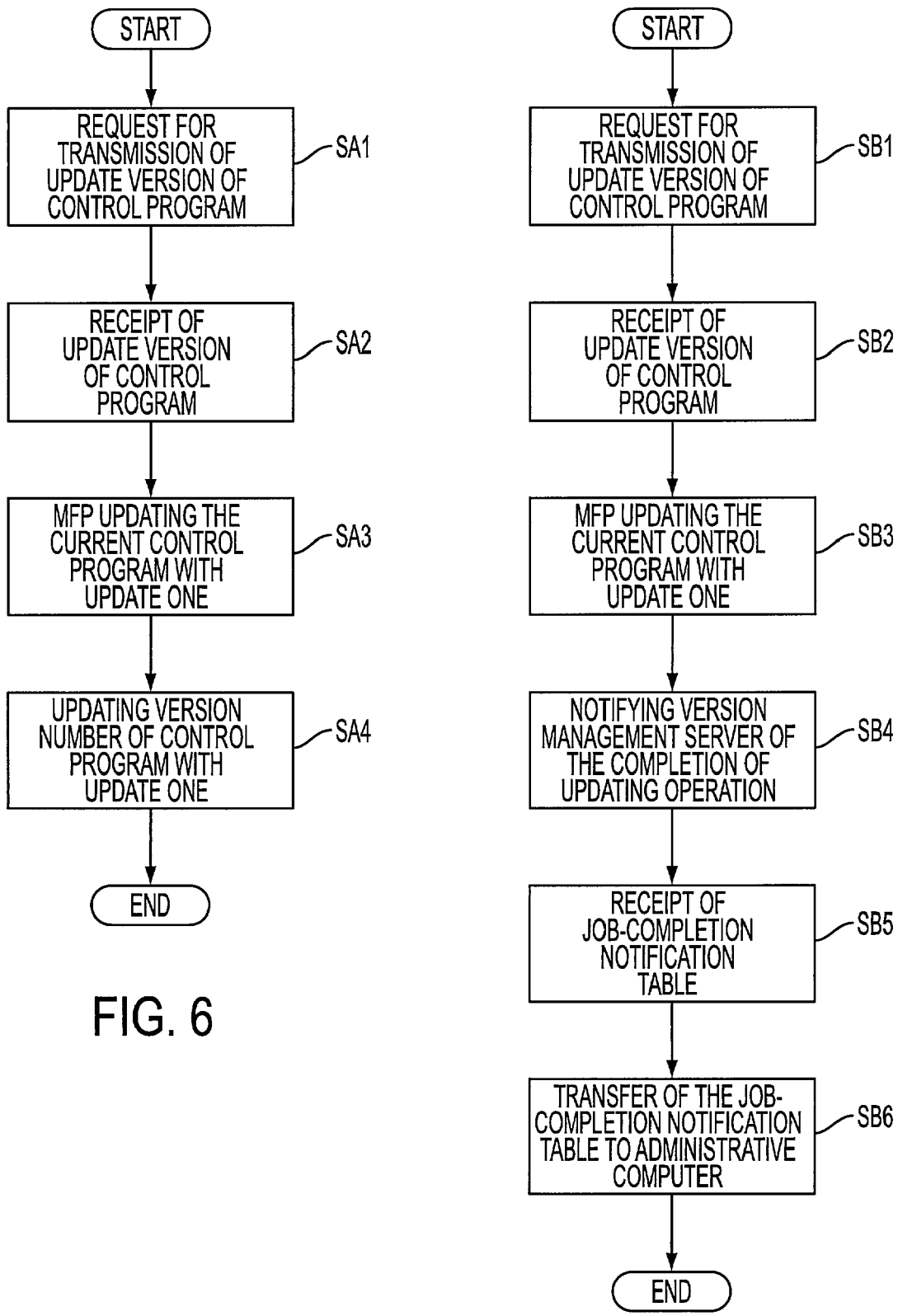
FIG. 6 is a flow chart illustrating the version-up operation of the control program according to the pattern A.
FIG. 7 is a flow chart illustrating the version-up operation of the control program according to the pattern B.

(1) Pattern A (Full-Automatic Type as Referred to FIG. 6)

When the MFP 4 updates a program version according to the current control program stored in the control program storing region 46a of the storage section 46, it refers to the mode setting storing region 46d and identifies the mode setting to be the pattern A. Then, the MFP 4 instructs the version management server 1 via the communication network 2 of the route RT 1 to transmit an update version of the control program in step SA 1. The version server 1 transmits to the downloading server 3 the instructed update version of the control program via the route RT 2, and then the MFP 4 receives from the downloading server 3 the update version of the control program transmitted thereto in step SA 2.

Then, the MFP 4 updates with the update control program thus received the current control program stored in the control program storing region 46a of the storage section 46 in step SA 3 and change the version number in the version managing data storing region 56b of the administrative computer 5 into an update number in step SA 4. From now on, the MFP controlling section 45 will control various sections in the MFP 4 according to the update-version control program as above. Accordingly, in the case that this pattern A is set, the MFP 4 automatically replaces the current control program with the update-version control program based on the execution command of the version-up operation while the administrative computer 5 updates the version number stored in the version management data storing region 56b thereof without notifying the administrator on the user's side. In particular, as far as this pattern A is concerned, it may be possible not to provide the administrative computer 5 with any information regarding replacement. The setting of this pattern A is sufficiently satisfactory for the administrative computer 5 if the administrative computer 5 on the user's side is not fully capable of dealing with such a replacement.

(2) Pattern B (Automatic Type as Referred to FIG. 7)

When the MFP 4 updates a program version according to the current control program stored in the control program storing region 46a of the storage section 46, it refers to the mode setting storing region 46d and identifies the mode setting to be the pattern B. Then, the MFP 4 instructs the version management server 1 via the communication network 2 of the route RT 1 to transmit an update version of the control program in step SB 1. The version server 1 transmits to the downloading server 3 the instructed update version of the control program via the route RT 2, and then the MFP 4 receives from the downloading server 3 the update version of the control program transmitted thereto in step SB 2.

Then, the MFP 4 updates with the update control program thus received the current control program stored in the control program storing region 46a of the storage section 46 in step SB 3, and notifies the version management server 1 of the completion of the updating operation in SB 4. In order to notify the MFP 4 of the completion of a job performed in association with the version-up of the control program, the version management server 1 transmits to the MFP 4 a table of a job-completion notification via the route R1, as a result of which the MFP 4 receives it in step SB 5. From now on, the MFP controlling section 45 of the MFP 4 will control various sections in the MFP 4 according to the update-version control program as above in step SB 6. Also, the MFP 4 notifies the administrative computer 5 of the job-completion notification table thus received.

In the administrative computer 5 thus notified of, the PC controlling section 51 which usually performs a control according to the PC controlling program stored in the PC controlling program storing region 56c controls, upon activation of a version-up operation according to the pattern B, the displaying section 57 to display thereon the content of the job-completion notification table according to the version-up program stored in the version-up program storing region 56a. What are updated at this time are a display as shown in FIG. 10 and the content stored in the displaying section and the storage section 56 as, inclusive of an update of a version number stored in the version managing data storing region 56b.

FIG. 10 illustrates: Model Numbers MDL 10, MDL 33, MDL 50 and MDL 87 corresponding to respective control programs; their serial numbers; old version numbers; updated (new) version numbers; and version-up contents where is appropriate. In the case of the pattern B being set, the MFP 4 will automatically replace the current control program with an update version one according to an execution command of the version-up and simultaneously render an information concerning that replacement to the administrative computer 5. Namely, the setting of the pattern B is appropriately enabled if the administrative computer 5 on the user's side is fully capable of dealing with such a replacement, with a result that more elaborate capability can be accomplished as compared with the setting of the pattern A.

Figure 8:
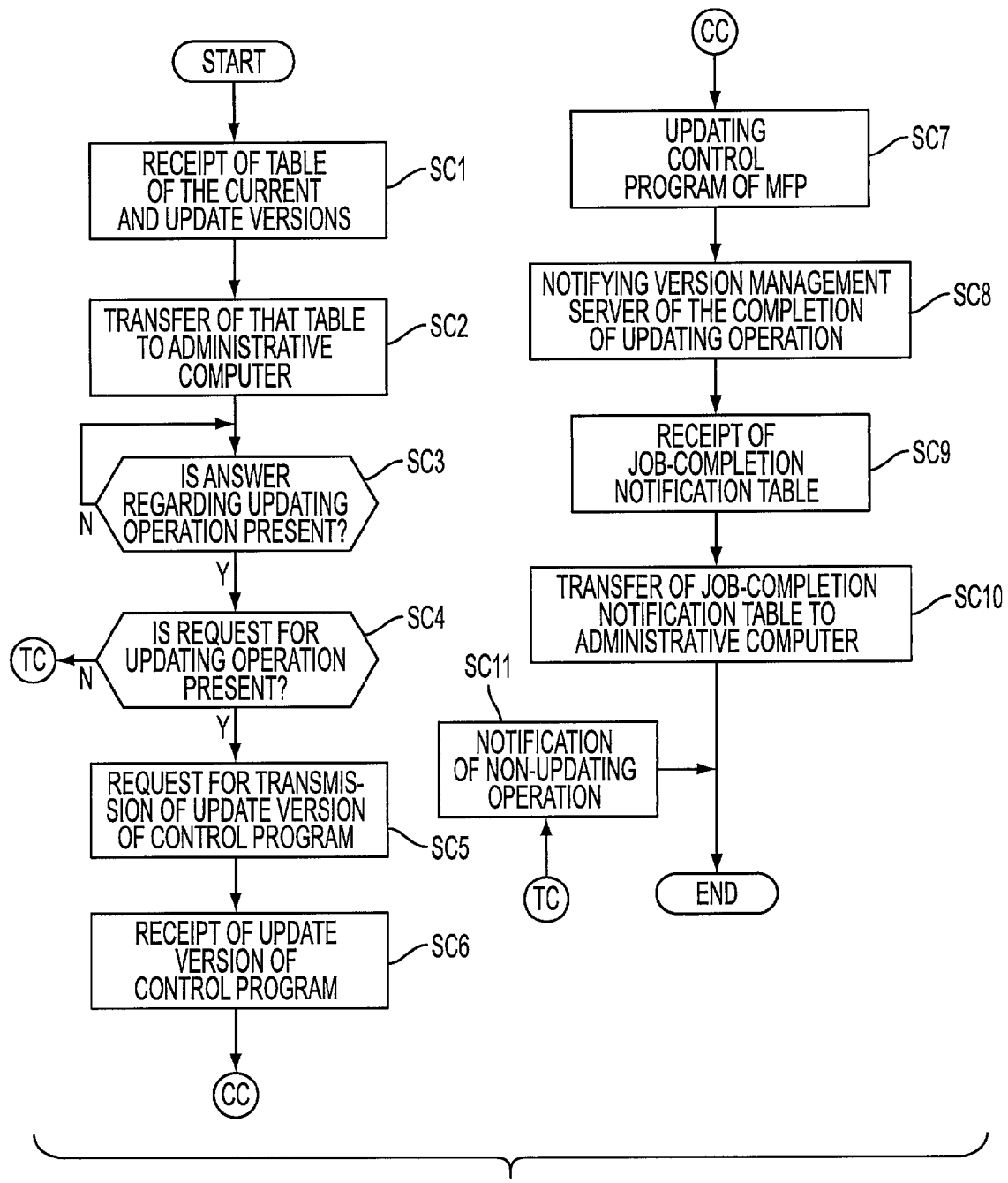
FIG. 8 is a flow chart illustrating the version-up operation of the control program according to the pattern C.

(3) Pattern C (Push-Manual Type as Referred to FIG. 8)

The MFP 4 receives a table of a version-up query (as shown in FIG. 11) which is transmitted from the version management server 1 and which compares the current version with an update version in step SC1. Since the MFP 4 can identify the pattern C as the set mode by referring to the mode setting storing region 46d, the MFP 4 transfers the received version-up query table to the administrative computer 5 in step SC 2. Then, the administrative computer 5 controls the display section 57 to display thereon the transferred version-up query table. Here, if there is any model of an update version, the administrative computer 5 ask the administrator a query whether or not the model should be updated. In response to that query, if the version-up is desired, a symbol "X" as a check mark will be inputted in a check box as shown in FIG. 12. Hence, as an operation of that version-up is commanded, the administrative computer 5 transmits such an input information to the MFP 4.

The MFP 4 decides in step SC 3 whether or not there is any answer about an update in the input information transmitted from the administrative computer 5. If there is such an answer, the MFP 4 decides in step SC 4 whether or not there is any model required to be updated. If it has been decided there is no model required to be updated, the MFP 4 will conduct a notification to the version management server 1 that the control program is not to be updated in step SC 11, thereby this flow being ended. However, if it has been decided there is any model required to be updated, the MFP 4 will request the version management server 1 via the route RT 1 to transmit a control program of the update version for its corresponding model in step SC 5, and receive that update-version control program transmitted via the route RT 2 in step SC 6.

Then, the MFP 4 which has already received the update-version control program will update with the update-version control program the current control program previously stored in the control program storing region 46a of the storage section 46 in step SC 7. After that update, the MFP 4 notifies the version management server 1 of the program updating operation being completed in step SC 8. In order to notify the MFP 4 of the completion of a job which has been executed in association with the version-up operation of the control program, the version management server 1 which has been notified of the completion of the updating operation transmits to the MFP 4 via the route RT 1 a table of a job-completion notification (as shown in FIG. 10), as a result of which the MFP 4 receives it in step SC 9. From now on, the MFP controlling section 45 of the MFP 4 will control various sections in the MFP 4 according to the update-version control program as above. Also, the MFP 4 notifies the administrative computer 5 of the job-completion notification table thus received.

In the administrative computer 5 thus notified of, the PC controlling section 51 which usually performs a control according to the PC controlling program stored in the PC controlling program storing region 56c controls, upon activation of the version-up operation according to the pattern B, the displaying section 57 to display thereon the content of the job-completion notification table according to the version-up program stored in the version-up program storing region 56a. What are updated at this time are a display as shown in FIG. 10 and the content stored in the version managing data storing region 56b of the storage section 56, inclusive of an update of a version number stored in the version managing data storing region 56b, and then this flow is ended.

In the case of the pattern C being set, the MFP 4 receives a table of a version which is transmitted from the version management server 1 and which compares the current version with an update version and transfer it to the administrative computer 5 so as to be displayed on the display section 57. If there is any model of the update version, the administrative computer 5 ask the administrator a query whether or not the model should be updated. Accordingly, if the administrator is in an situation in which administrator can normally operate the administrative computer 5, the user can control the administrative computer 5 to execute an appropriate version-up operation in a correspondence manner to the actual situation, or otherwise not to execute a version-up operation if there is any inconvenience.

Figure 9:
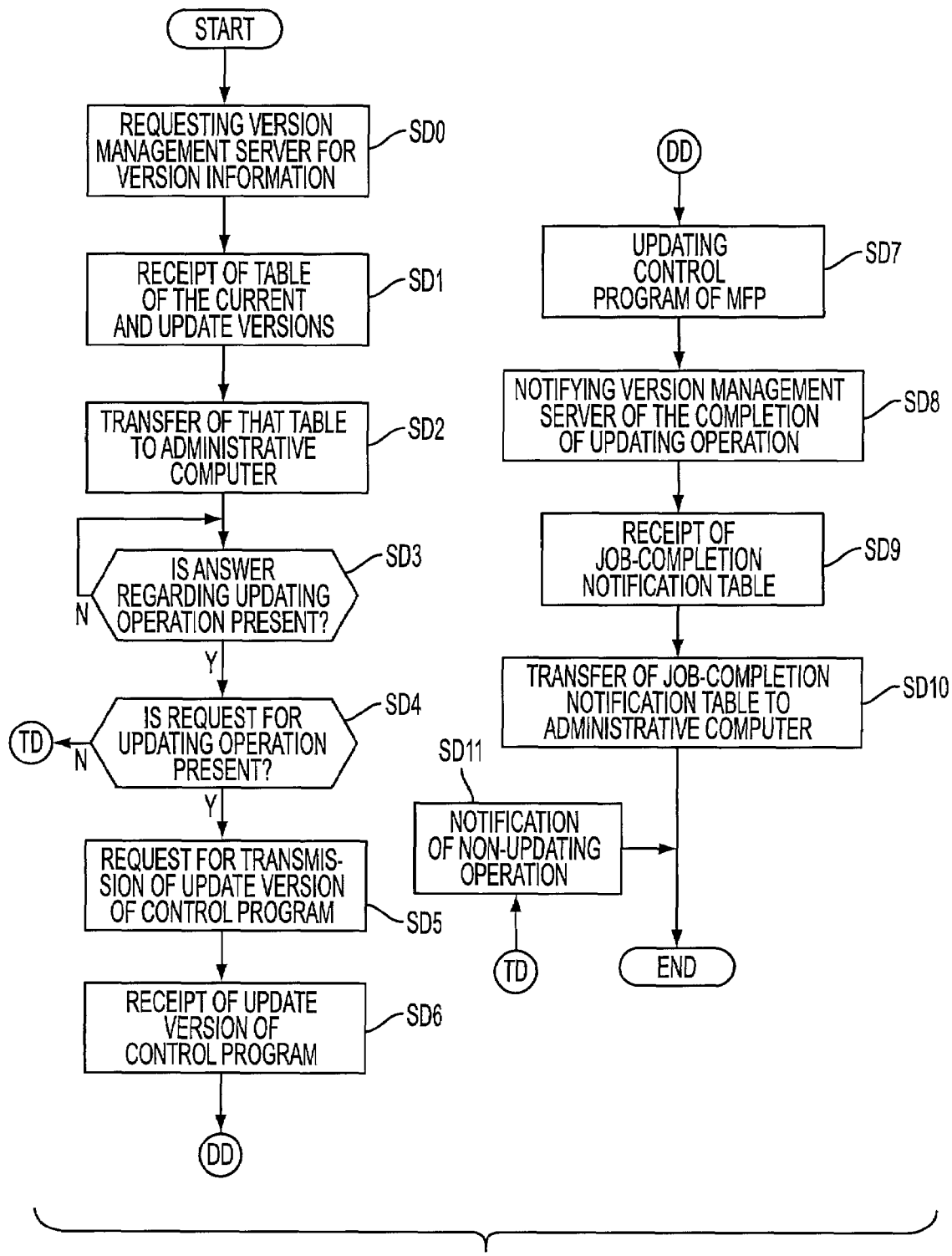
FIG. 9 is a flow chart illustrating the version-up operation of the control program according to the pattern D.

(4) Pattern D (Pull-Manual Type as Referred to FIG. 9)

When the MFP 4 updates a program version according to the control program stored in the control program storing region 46a of the storage section 46, it refers to the mode setting storing region 46d and identifies the mode setting to be the pattern D. Then, the MFP 4 requests the version management server 1 via the route RT 1 to transmit a version information indicating whether or not there is any change in the control program in step SD 0. The version management server 1 which has received such a request transmits to the MFP 4 via the route RT 1 a table of version (as referred to FIG. 11) which compares the current version with an update version, while the MFP 4 receives the version table via the communication network 2 of the route RT 1 in step SD 1.

Since the MFP 4 has already identified the mode setting to be the pattern D, it transfers the received version table to the administrative computer 5 in step SD 2. Then, the administrative computer 5 controls the display section 57 to display thereon the transferred version table. Here, if there is any model of the update version, the administrative computer 5 ask the administrator a query whether or not the model should be updated. In response to that query, if the version-up is desired, a symbol "X" as a check mark will be inputted in a check box as shown in FIG. 12. Hence, as an operation of that version-up is commanded, the administrative computer 5 transmits such an input information to the MFP 4. Then, the MFP 4 decides in step SD 3 whether or not there is any answer about an update in the information transmitted from the administrative computer 5. If there is such an answer, the MFP 4 decides in step SD 4 whether or not there is any model required to be updated.

If it has been decided there is no model required to be updated, the MFP 4 will conduct a notification to the version management server 1 in step SD 11 that the control program is not to be updated and this flow is ended. However, if it has been decided there is any model required to be updated, the MFP 4 will request the version management server 1 via the route RT 1 to transmit a control program of the update version for its corresponding model in step SD 5, and receive that update-version control program transmitted via the route RT 2 in step SD 6. Then, the MFP 4 which has received the update-version control program will update with the update-version control program the current control program previously stored in the control program storing region 46a of the storage section 46 in step SD 7.

After that update, the MFP 4 notifies the version management server 1 of the program updating operation being completed in step SD 8. In order to notify the MFP 4 of the completion of a job which has been executed in association with the version-up operation of the control program, the version management server 1 which has been notified of the completion of the updating operation transmits to the MFP 4 via the route RT 1 a table of a job-completion notification (as shown in FIG. 10), as a result of which the MFP 4 receives it in step SD 9. From now on, the MFP controlling section 45 of the MFP 4 will control various sections in the MFP 4 according to the update-version control program as above. Also, the MFP 4 notifies the administrative computer 5 of the job-completion notification table thus received.

In the administrative computer 5 thus notified of, the PC controlling section 51 which usually performs a control according to the PC controlling program stored in the PC controlling program storing region 56c controls, upon activation of the version-up operation according to the pattern D, the displaying section 57 to display thereon the content of the job-completion notification table according to the version-up program stored in the version-up program storing region 56a. What are updated at this time are a display as shown in FIG. 10 and the content stored in the version managing data storing region 56b of the storage section 56, inclusive of an update of the version number stored in the version managing data storing region 56b, and then this flow is ended.

In the case of the pattern D being set, the MFP 4 requests the version management server 1 and receives therefrom a table of version-up query (as referred to FIG. 11), which compares the current version with the update version where is necessary according to the administrator's situation. Then, the MFP 4 transfers the version-up query table to the administrative computer 5 to be displayed on the display section 57. If there is any model of the update version, the administrator is given a query whether or not the model should be updated. Accordingly, the administrator is capable of performing the version-up operation at the administrator's convenience when he/she can operate the administrative computer 5. Otherwise, it is also possible not to perform the version-up operation at the time, e.g., when the administrator is in an inconvenient situation.

In association with each version-up query of the patterns C and D, the table as shown in FIG. 10 is firstly configured to be displayed on the administrative computer 5 in the above embodiment, the present invention is not limited to this configuration. In the contrary, the table as shown in FIG. 11 may firstly be configured to be displayed on the administrative computer, thereby taking off an unnecessary check mark "X" from the check box. Also, even if a plurality of the models are all enabled to be made version-up, it is possible to give a permission only one of them to be made version-up.

FIG. 13 is a block diagram illustrating one example of more specifically implementing the program management system as shown in FIG. 1.

In this ease, a version management server 110 is connected to a MFP (Multi-function Peripheral) and an administrative computer 150 as devices on the user side, via a first route RT 1 (such as the Internet) as a communication network comprising WANs 121, 123 and 125, a management server 122 and a distributor 124, and via a second route RT 2 (having a larger transmission capacity) comprising a downloading server 130.

The MFP 140 and administrative computer 150 as userside devices in this example are connected to the first route RT 1 and second routes RT 2 via a firewall 141. The administrative computer 150, on the other hand, is connected to the first route RT 1 via the public switched telephone network (PSTN) and the WAN 125. In this example, it is assumed that the management server 122 is located (in a foreign country or) distant from the version management server 110. It will be understood by those skilled in the art that the program management systems as shown in FIGS. 1 and 13 are configured to update a control program (an object to be updated), but it is possible to update the other programs or setting values in a similar fashion. Further, both of the first and second routes RT 1 and RT 2 are configured to be used as the communication networks, but it is possible to use only one route such as the Internet. Furthermore, the embodiments as described above are configured to use a MFP as an object to be made version-up, but the present invention is not limited to this. The version-up operation according to the present invention is also applicable to business machines inclusive of a administrative computer as well as a copying machine and a fax machine (an object to be updated).

In the program management system according to the present invention as described above, the user of a multi-function peripheral device is capable of performing a version-up operation of a program of the multi-function peripheral device according to a pattern set by pattern setting means setting therein that pattern as an optimum one suitable for a user's situations or affairs. Thus, when the version-up operation is activated, program updating means will automatically perform the version-up operation of the program of the multi-function peripheral device according to the optimum and selected pattern set by the pattern setting means, thereby satisfying user's requirements.

What is claimed is:

1. A program management apparatus adapted to perform a program updating operation of a program by downloading the program from a server which manages an information of the program to a predetermined terminal device that is controlled by a separate administrative computer, comprising:

pattern setting means, which retains plural kinds of patterns each serving as a mode for giving an information inclusive of a program and updating such a program, for allowing a user to select one of the patterns so as to previously set it as a selected pattern; and program updating means for, upon activation of a program updating operation, automatically performing said updating operation according to said selected pattern set by said pattern setting means, wherein said plural kinds of patterns include at least two of: a) a full automatic type by which updates are performed for said program in said predetermined terminal device without notifying said separate administrative computer, b) a partial automatic type by which updates are performed for said program in said predetermined terminal device with notification being made to said separate administrative computer, c) a push-manual type by which updates are performed for said program in said predetermined terminal device only upon approval by said user using said separate administrative computer after being informed of said updates, and d) a pull-manual type by which updates are performed for said program in said predetermined terminal device by said predetermined terminal device requesting a version management server to transmit version information to said predetermined terminal device so that said user using said separate administrative computer can compare a current version of said program with an updated version of said program and decide whether or not an update should be made, wherein said plural kinds of patterns include the partial automatic type of updating and, in the partial automatic type of updating, the version management server transmits a job-completion notification table via a first network to the predetermined terminal device, and wherein the program is updated by said version management server sending information to said predetermined terminal device via a second network different from the first network, wherein the job-completion notification table includes information to be displayed at the separate administrative computer that indicates capability differences with respect to utilization of said predetermined terminal device when said program is updated in said predetermined terminal device, and wherein said plural kinds of patterns include the push-manual type and the pull-manual type of updating and, in the push-manual type and in the pull-manual type of updating, the version management server also transmits the job-completion notification table via the first network to the predetermined terminal device, in which the job-completion notification table further includes added information that is not included in the job-completion notification table for the partial automatic type of updating, the added information including a check box that is displayed on a display of the separate administrative computer for the user to use in order to select one or more updates for the program.

2. In a program management system, which includes a server for managing an information of a program and a program management apparatus connectable to the server via a communication line, adapted to perform a program updating operation of the program by downloading the program from the server to a terminal device via the communication line, said program management apparatus comprising:

pattern setting means, which retains plural kinds of patterns each serving as a mode for giving an information inclusive of a program and updating such a program, for allowing a user to select one of the patterns so as to previously set it as a selected pattern; and program updating means for, upon activation of a program updating operation, automatically performing said updating operation according to said selected pattern set by said pattern setting means, wherein said plural kinds of patterns include at least two of: a) a full automatic type by which updates are performed for said program in said predetermined terminal device without notifying said separate administrative computer, b) a partial automatic type by which updates are performed for said program in said predetermined terminal device with notification being made to said separate administrative computer, c) a push-manual type by which updates are performed for said program in said predetermined terminal device only upon approval by said user using said separate administrative computer after being informed of said updates, and d) a pull-manual type by which updates are performed for said program in said predetermined terminal device by said predetermined terminal device requesting a version management server to transmit version information to said predetermined terminal device so that said user using said separate administrative computer can compare a current version of said program with an updated version of said program and decide whether or not an update should be made, wherein said plural kinds of patterns include the partial automatic type of updating and, in the partial automatic type of updating, the version management server transmits a job-completion notification table via a first network to the predetermined terminal device, and wherein the program is updated by said version management server sending information to said predetermined terminal device via a second network different from the first network, wherein the job-completion notification table includes information to be displayed at the separate administrative computer that indicates capability differences with respect to utilization of said predetermined terminal device when said program is updated in said predetermined terminal device, wherein said plural kinds of patterns include the push-manual type and the pull-manual type of updating and, in the push-manual type and in the pull-manual type of updating, the version management server also transmits the job-completion notification table via the first network to the predetermined terminal device, in which the job-completion notification table further includes added information that is not included in the job-completion notification table for the partial automatic type of updating, the added information including a check box that is displayed on a display of the separate administrative computer for the user to use in order to select one or more updates for the program.

* * * * *